United States Patent [19]

Spies et al.

[11] 4,117,730
[45] Oct. 3, 1978

[54] SENSOR SYSTEM FOR RELEASING PASSIVE SAFETY APPARATUS IN CAR CRASHES

[75] Inventors: Johann Spies, Pfaffenhofen; Alfons Wohrl, Schrobenhausen, both of Germany

[73] Assignee: Messerschmitt-Bolkow-Blohm Gesellschaft mit beschrankter Haftung, Munich, Germany

[21] Appl. No.: 780,015

[22] Filed: Mar. 22, 1977

[30] Foreign Application Priority Data

Mar. 23, 1976 [DE] Fed. Rep. of Germany ....... 2612215

[51] Int. Cl.$^2$ ............................................. B60R 21/00
[52] U.S. Cl. .................................. 73/517 R; 307/121; 340/52 H
[58] Field of Search ..................... 73/71.2, 517 R, 517; 340/52 H, 262; 307/121; 180/103 A

[56] References Cited

U.S. PATENT DOCUMENTS

| 3,870,894 | 3/1975 | Brede et al. ..................... 307/121 X |
| 4,020,453 | 4/1977 | Spies et al. ....................... 307/121 X |

Primary Examiner—Charles A. Ruehl
Attorney, Agent, or Firm—Toren, McGeady and Stanger

[57] ABSTRACT

A sensor system for the release of passive safety systems such as air cushions, belt tighteners or similar arrangements during car collisions is disclosed. The sensor system is designed to release the passive safety systems only within predetermined limits. The sensor system will prevent release of the safety systems during improper voltage conditions. Asymmetrical limitation of the acceleration-responsive electrical signal is provided. The provision of delay elements and a circuit for avoiding release of the passive systems during ordinary acceleration conditions insure the use of the safety systems only during collision situations.

16 Claims, 1 Drawing Figure

U.S. Patent     Oct. 3, 1978     4,117,730
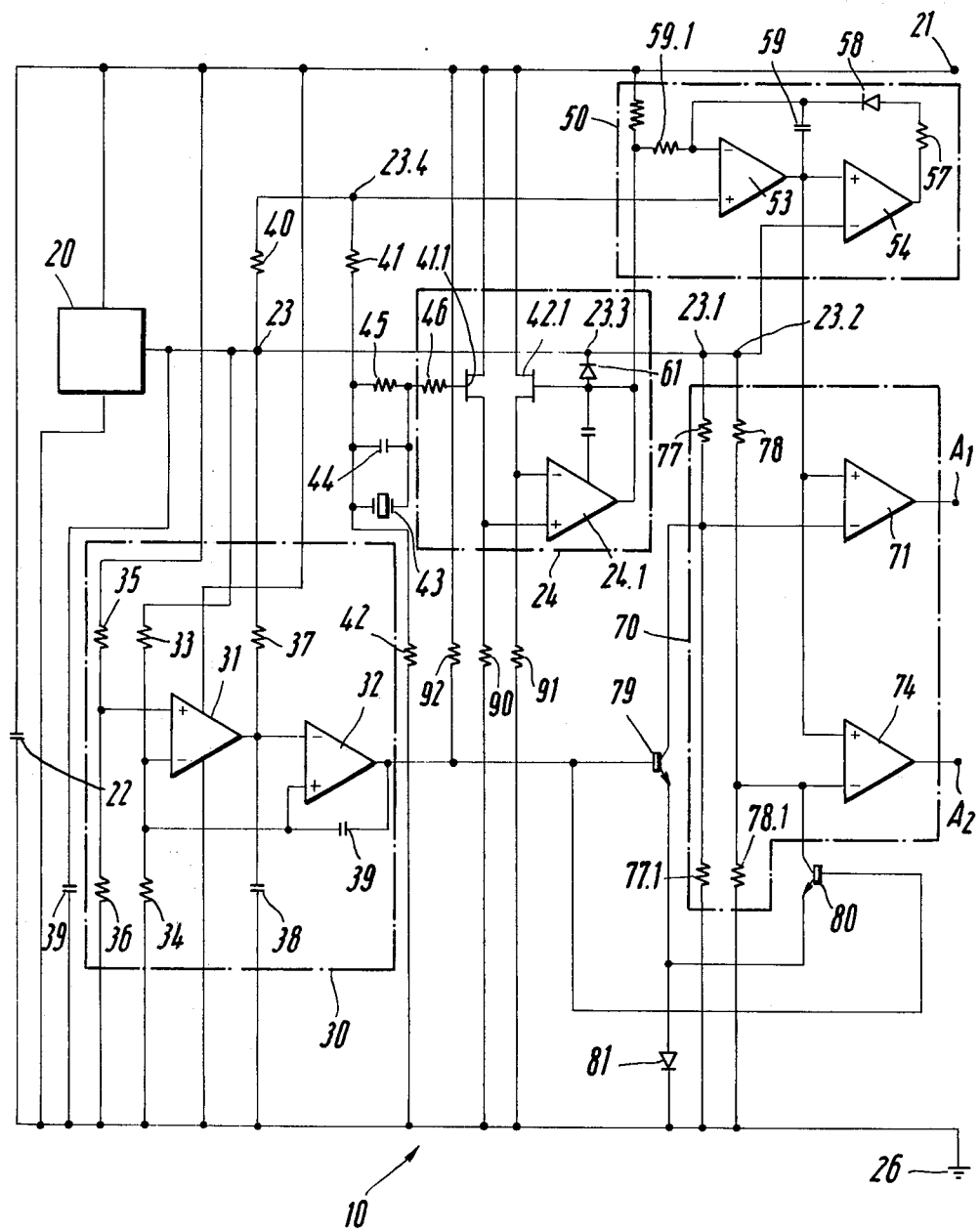

SENSOR SYSTEM FOR RELEASING PASSIVE SAFETY APPARATUS IN CAR CRASHES

FIELD OF THE INVENTION

The invention concerns a sensor for releasing a passive safety apparatus, like air bags and belt tighteners in car crashes, and, more particularly, with an electromechanical transducer which transforms accelerations and mechanical actions into electrical signals and which provides a release signal only within predeterminable limiting values.

BACKGROUND OF THE INVENTION

U.S. Pat. No. 3,455,148 describes a vibration measuring device for piston-type machines or other mechanical machinery in which a piezoelectric crystal is used as an electromechanical transducer for detecting and indicating inadmissibly high vibrations. This is done by evaluating the vibration-connected acceleration and using the evaluation in the structure of the machinery.

An object of the piezoelectric crystal and of the following evaluation circuit is to generate an electrical signal when a predetermined vibration threshold and an acceleration related thereto is exceeded, which is suitable as an indication or for shutting the machinery. High-frequency vibrations of very short duration should not lead to any such indication or disconnection, since they have no undue influence on the machinery. For this purpose, an additional evaluation circuit is provided. Further, adjustable feedback is provided which serves to bring the threshold of a differential amplifier to the permissible vibration limit, depending on the type of the machine.

Piezoelectric elements for use as vibration or acceleration detectors are also employed in the safety engineering of cars where safety devices are actuated by electronic sensors to protect the passengers. This is done when a car strikes against an obstacle, for example, and the actuation may be the release of air bags or the tightening of belts.

The technical problems resulting from the application of these sensors in cars are much greater than their use in stationary machinery. On the one hand, the sensitivity of the sensors must be very high because of the rapidity of the movements. Thus, for example, in an impact at 50 kmh, both the recording of the impact and the safety measures taken, like the tightening of a belt or inflation of the air bag, must be completed within 40 milliseconds (ms). On the other hand, the action must not occur during ordinary conditions for obvious reasons, even though impact-type criteria are provided on the sensor. For example, when a car drives over an obstacle or even in normal braking, the safety system must not be released. It must also be kept in mind that below a certain acceleration, e.g. at about 4 g, the passengers can absorb accelerations even without additional restraining measures. Under these circumstances, the release of the safety devices could even increase the safety risk, so that the opposite of the actual objective would be achieved.

It was found that a crash situation is characterized particularly in that the polarity or sign of the acceleration does not change over a much longer period of time than occurs in intensive short-time accelerations, which are typical when driving over a curb or under a hammer blow. In the latter instances, the polarity of the acceleration changes repeatedly in a very short period of time.

Starting from this background, a piezoelectric impact sensor is known from U.S. Pat. No. 3,701,903 which has an amplitude limiter, an integrator, and a nominal value circuit, in addition to two piezoelectric crystals for shocks from different directions from the front of the system. The amplitude limiter in the form of a Zener diode has the function of limiting the upward amplitude of shock, so that the following integrator attains the threshold voltage only upon the occurrence of shocks with longer lasting accelerations. If the amplitude of shocks is too small, that is, below the level determined by the Zener diode, no output signal is provided from the integrator. The integrator also has the effect that the release voltage for the threshold value switch is attained only after a predetermined period of time. The resetting of the integrator, after the occurrence of shocks below the release threshold, is effected by way of a discharge resistance. As a voltage source for the release of the safety device, a capacitor is used which is charged from a voltage source in the car. Due to the above described arrangement of the piezoelectric crystals, the system reacts in the predetermined manner only to shocks from the front.

Another embodiment of an impact sensor for cars is known from DOS No. 2,207,831. This sensor too, works on the premise that a true release situation is characterized by the unchanged polarity of the voltage tapped from the piezoelectric crystal over a longer period of time. An electronic trigger circuit is arranged behind the piezoelectric element which changes state after attaining a predetermined threshold value. Accordingly, a delay stage is driven which in turn effects the ignition of a release element of the safety device at a preselected time after the trigger circuit has changed state. Preceding the trigger circuit is a potentiometer whose setting represents the change-of-state value of the trigger. The settings of the circuit can be so selected that the trigger stage acts an an integration amplifier. In this manner, a signal proportional to the voltage on the piezoelectric element is generated, so that the delay stage is started and stopped corresponding to this signal.

It follows from the foregoing considerations that sensors of the above described type are based on the evaluation of the duration and amplitude of an occurring acceleration. It is necessary for the reliability of these circuits that measures be taken for the logical processing of the signal in the sensor so the safety device is only released in an actual crash situation. It was found that the reliable operation of the sensor depends to a great extent on the observation of the accompanying circumstances occurring before a possible crash. A number of critical situations can be listed which cannot be processed by the presently known sensors or can only be insufficiently processed.

A critical situation exists, for example, in the collision-type accident. It happens frequently that a driver's own braking efforts would be sufficient for stopping his car, but his car is then hit by a following car. If no special measures are provided within the circuit, this negative acceleration applied to the piezoelectric crystal can reduce the release threshold so much that the sensor will not release during the impact which typically follows. Furthermore, there has not been sufficient consideration given to the fact that the delay time for the release of the safety system depends on the size of the occurring acceleration. That is, the critical speed relative to the passenger is achieved correspondingly sooner at higher accelerations, and, therefore, the safety system must be sooner released than at low accelerations. Consequently, measures must be taken to ensure that the release provided by the sensor will take place when the critical speed is achieved.

Another critical point is the voltage supply for the sensor from the supply system of the car. When starting the car, turning on loads such as lamps, radio, sliding roof, etc., when disconnecting the battery, and in a number of other processes in the car, undefinable conditions appear in the voltage supply system which can lead to misfunctions both during the ride and during the stopping of the car. Finally, since short circuits at any point within the circuit may lead to release of the system, particular attention must be given to making the sensor system of the circuit both reliable and passive. To this end, it is not sufficient merely to disconnect the voltage sources.

SUMMARY OF THE PRESENT INVENTION

An object of the invention therefore is to provide a sensor system for determining the release threshold corresponding to an actual crash situation which is dangerous to the passengers. By using electromechanical transducers dependent on the respective voltage signals generated by the effective accelerations and/or force, the sensor system disregards those accelerations and mechanical actions for the release of the system which originate from actions other than a crash situation.

In accordance with the present invention, a sensor system for releasing passive safety systems such as air cushions, belt tighteners or similar arrangements during car collisions comprises transducer means for providing an electrical signal responsive to vehicular accelerations, means for supplying an input voltage, and reference voltage means responsive to the input voltage means for supplying a stabilized reference voltage to said sensor system. Also included are amplifier means responsive to the electrical signal from the transducer means for effecting bipolar asymmetrical limitation of the transducer signal. Means responsive to the transducer means signal and to the amplifier means for integrating the acceleration-associated signal are included. Switching threshold means for providing release signals to said passive safety systems are included as well. The switching threshold means further includes evaluation means for setting predetermined switching conditions of the switching threshold means, the switching threshold means being responsive to the integrator means and the reference voltage means. Finally included are voltage monitor means responsive to the input voltage means and the reference voltage means for blocking the release signals from the switching means upon the occurrence of an improper voltage condition.

For a better understanding of the present invention together with other and further objects thereof, reference is made to the following description and accompanying drawing, while the scope of the invention will be pointed out in the appended claims.

DESCRIPTION OF THE PREFERRED EMBODIMENTS

The only FIGURE shows a sensor system 10 which transforms mechanical quantities into analog electrical signals and which consists substantially of the assemblies outlined in broken lines. These assemblies are designated as amplifier circuit 24, car voltage monitor circuit 30, integrator means 50, and switching threshold circuit 70. The amplifier 24 is preceded by an electromechanical transducer 43 in the form of a piezoelectric crystal. A reference voltage source 20 and a car voltage source (or input voltage) (not shown) are provided whose terminals are designated by 21 and 26.

The reference voltage source 20 is connected to the positive pole 21 of the car voltage source and to one or several emergency voltage supplies 22—in this embodiment, a capacitor. The output of the reference voltage source 20 is connected to the input of the car voltage monitor circuit 30 which consists of the comparators 31 and 32 and voltage dividers 33, 34 and 35, 36 as well as an RC section acting as a timing element 37, 38. In addition, capacitors 39 are provided for filtering out higher frequency oscillations.

The reference voltage source is connected over switching point 23 to a resistor 37 of timing element 37, 38 serving as a dead time switch, and to a voltage divider consisting of a resistor 40, 41 and 42. The non-inverting input of the integrator means 50 is connected at switch point 23.4. Integrator means 50 substantially consists of two portions, an integrator 53 and an amplifier 54. The switch point 23 is furthermore connected to the cathode of a diode 61 and to the inverting input of the amplifier 54.

The switching threshold circuit 70, consisting of comparators 71 and 74, is connected with its inverting inputs to voltage divider 78, 78.1 and 77, 77.1 and by way of switch points 23.1 and 23.2 to the reference voltage source 20. Furthermore, the inverting inputs of the comparators 71 and 74 are connected to the collectors of switching transistors 79 and 80. The bases of the transistors 79 and 80 are connected to the input of comparator 32 of the car voltage monitor circuit 30 and by way of resistor 92 to terminal 21 of the car voltage supply, while the emitters of the transistors are connected by way of a diode 81 to the negative potential terminal 26 of the car or input voltage source.

The outputs A1 and A2 of the comparators 71 and 74 of the switching threshold circuit 70 can be supplied to the release circuit (not shown) of the safety system (likewise not shown) of the car. This safety system is described, for example, in the publication A.S.E. (General Motors, Driver Air Cushion, Restraint System-Automobile Engineering Meeting, Detroit, Michigan, May 14–18, 1973, no. 730605).

The integrator means 50 consists, as mentioned above, substantially of the two portions 53 and 54, with portion 53 being designed as an integrator and amplifier 54 as a unipolar nullpoint regulator. The output of amplifier 53 is connected to the non-inverting inputs of the comparators 71 and 74 and to the non-inverting input of amplifier 54. The integrating loop for amplifier 53 is formed by a capacitor 59 and a resistor 59.1. The output of amplifier 54 is fed back by way of a resistor 57 and a diode 58 to the inverting input of amplifier 53.

The electromechanical transducer 43, represented by a piezoelectric crystal, is connected in parallel to a capacitor 44 and a resistor 45. One terminal of the electromechanical transducer is connected to the above mentioned voltage divider formed by resistors 40, 41 and 42, by which an integral threshold is determined on the non-inverting input of integrator 53. This threshold can be set, e.g., to 4 g. The other terminal of the transducer is connected to amplifier circuit 24 consisting substantially of two field-effect transistors 41.1 and 42.1 and amplifier 24.1 proper. To this end, this terminal leads by way of a current limiting resistor 46 to the control electrode of field effect transistor 41.1. The source electrode of transistor 41.1 is connected to the non-inverting input of amplifier 24.1. The source electrode of the second field effect transistor 42.1 is connected to the non-inverting input of amplifier 24.1. The two transistors are arranged with their drain electrodes parallel to the car voltage supply, while the source electrodes and the terminals of amplifier 24.1 are connected by way of resistors 90, 91 to the negative potential terminal 26 of the car voltage source. The output of amplifier 24.1 is connected to the control electrode of transistor 42.1 and to the anode of diode 61. In addition, the output of amplifier circuit 24 is connected as described above, to the inverting input of integrator means 50.

The mode of operation of the car voltage sensor 30 is as follows:

When the car voltage source is connected, the reference voltage source 20 serves to stabilize the voltage, for example, to +50 volts.

The car voltage monitor circuit 30, integrator means 50, voltage divider 40, 41, 42 and switching threshold circuit 70, representing the evaluation elements, are connected to the reference voltage source 20 so that the stabilized voltage of source 20 serves as a reference scale for all analog evaluations in the sensor.

The car voltage sensor 30 following the reference voltage source 20 receives the car voltage on the non-inverting input of comparator 31 by way of the voltage divider comprising the resistors 35 and 36 connected to the car voltage source 21. The voltage divider formed by the resistors 33 and 34, which is connected to the reference voltage source 20, is applied to the inverting input of comparator 31. Comparator 31 therefore only disconnects when the car voltage has attained its minimum value. The timing element, consisting of resistor 37 and capacitor 38, has elemental values so that the output of the final stage 32 will switch, dependent upon the resistors 33 and 34, only after a predetermined period of time, e.g. 10 seconds. Thus, there can be no release in switching threshold circuit 70 before the end of this period.

A drop in the voltage below the minimum operating voltage at any time during the operation will lead to the connection of the final stage at the output of the comparator 31 and thus to a discharge of capacitor 38.

Only when the car voltage source 21 has attained its nominal value defined by reference voltage source 20 or a higher value, will the final stage of 31 be disconnected and the function of the timing element 37, 38 thus be released. The final stage of comparator 32 is connected when the final stage of comparator 31 is disconnected.

The voltage ratios of the car voltage source to reference voltage source are thus in the operating range. The output of comparator 32 drives switching transistors 79 and 80 into the blocked state. But when the final stage of comparator 32 is disconnected, the transistors 79, 80 are conductive. The emitters of the transistors 79 and 80 are connected by way of diode 81 to the negative pole of the car voltage source. Since the collectors of the switching transistors are connected to the respective inverting inputs of the comparators 71 and 74, switching the transistors 79 and 80 has the effect, as mentioned above, that the comparators 71 and 74 cannot provide a signal to their outputs A1 and A2.

As long as the switching transistors 79 and 80 are in the non-conductive state, so that the sensor is ready for operation, the input potential for the inverting inputs of the comparators 71 and 74 is determined by the reference voltage source 20 by the way of the voltage dividers 77, 77.1 and 78, 78.1. The voltage dividers 77, 77.1, and 78, 78.1 are so selected that the potential at the inverting input of comparator 74 is higher than the potential at the non-inverting input of comparator 71. This has the effect that comparator 74 always switches through before comparator 71. The output signals at terminals A2 and A1 serve to release the safety system for the passengers and the driver of the car, the release for the passengers taking place earlier.

Since the output of amplifier 24.1 is fed back to the control electrode of transistor 42.1, the source potentials of the transistors 41.1 and 42.1 are mirrored at the respective characteristic points; their generally square characteristic curvature is thus divided over the drain current by the factor of the no-load amplification of amplifier 24.1 and is thus practically eliminated. The threshold voltage of the amplifier consisting of the transistors 41.1 and 42.1 is adjusted in connection with the resistors 41 and 40 and diode 61 so that a linear behavior for the bipolar signals generated by the electromechanical transducer 43 with a defined limitation is achieved, which can be adjusted both in positive and in negative direction.

The adjustment of the negative evaluation limit is effected by means of voltage dividers 40, 41, 42 in connection with diode 61, which conducts current from the output of amplifier 24.1 into the reference voltage source 20. The amount of the negative limiting evaluation is set higher than that of the positive limiting evaluation.

In order to eliminate normal driving noise accelerations, a proportional constant voltage slightly above the normal driving noise accelerations, e.g. 4 g, is fed to the integrator means 50 by way of resistor 41 from negative evaluation voltage divider 40, 41, 42 to the non-inverting input of amplifier 53.

In order to relate the null point of the integrator to the common reference voltage source 20, the relative voltage level of amplifier 53 is maintained by means of amplifier 54, resistor 57 and diode 58 with respect to the potential of reference voltage 20. Due to the constant integration of a voltage signal corresponding to an acceleration of 4 g, for example, the integrator output (output of 53) is kept low at normal driving noise accelerations relative to the potential of reference voltage 20.

These measures solve both the problem of suppressing the normal driving noise accelerations and the integration constant problem. Furthermore, these measures ensure that the resetting of integrator 53 after negative accelerations is effected very rapidly. Further, the provision of a false output of the sensor in a rear collision followed by subsequent front collision, which is typical in mass collisions, is avoided.

As has been described above, the invention relates to a sensor using an amplifier circuit which provides bipolar asymmetrical limitation of the electrical signals of the transducer. A reference voltage source is fed from the car supply or emergency voltage source to serve as a reference quantity. A car voltage sensor disconnects the sensor system output in case of trouble in the voltage supply and/or voltage ratios in the sensor circuit.

According to a preferred embodiment of the invention, the reference voltage source, which is fed from the car or emergency voltage source, can be connected to all evaluation elements of the sensor to represent the reference scale and the car voltage sensors which compare the car voltage (input voltage) with the reference voltage to avoid false release at improper voltage ratios or when the voltage drops below the minimum operating voltage. When the incorrect conditions occur, an electronic switch is activated which disconnects the sensor output by making passive a comparator representing the output of the sensor.

Thus, one advantage of the present invention is that release of the safety devices of a car can only take place in a true crash situation, i.e. a situation dangerous for the passengers. To this end, any variation of the voltage potential within the sensor is checked automatically for its quality in order to transmit a release signal to the safety devices. The fact that each evaluation element of the circuit does the checking independent of the other evaluation elements, ensures that only voltage signals which originate from an impact that is dangerous for the passengers will lead to the activation of the safety system.

While specific embodiments of the invention have been shown and described in detail to illustrate the application of the inventive principles, it will be understood that the invention may be embodied otherwise without departing from such principles.

What is claimed is:

1. A sensor system for releasing passive safety systems such as air cushions, belt tighteners or similar arrangements, during car collisions, comprising:
   transducer means for providing an electrical signal responsive to vehicular accelerations;
   means for supplying an input voltage;
   reference voltage means, responsive to said means for supplying an input voltage, for supplying a stabilized reference voltage to said sensor system;
   amplifier means responsive to said electrical signal from said transducer means for effecting bipolar asymmetrical limitation of said electrical signal;
   means responsive to said electrical signal from said transducer means and to said amplifier means for integrating said electrical signal;
   switching threshold means for providing release signals to said passive safety systems, said switching threshold means further including evaluation circuit means for setting predetermined switching conditions of said switching threshold means, said switching threshold means responsive to said integrating means and said reference voltage means; and
   voltage monitor means responsive to said input voltage supply means and said reference voltage means for blocking the release signals from the switching threshold means upon the occurrence of an improper voltage condition.

2. The sensor system of claim 1 wherein said voltage monitor means is responsive to a predetermined improper voltage relationship between said input voltage supply means and reference voltage means.

3. The sensor system of claim 1 wherein said voltage monitor means is responsive to a failure of said means for supplying an input voltage.

4. The sensor system of claim 1 wherein said means for supplying an input voltage includes means for supplying a voltage derived externally to said sensor system.

5. The sensor system of claim 1 wherein said means for supplying an input voltage is an unstabilized emergency voltage source.

6. The sensor system of claim 5 wherein said unstabilized emergency voltage source is a capacitor.

7. The sensor system of claim 1 wherein said voltage monitor means includes a comparator for comparing a first voltage proportional to the reference voltage with a second voltage proportional to the input voltage, said comparator changing its output upon the occurrence of an improper relationship between said first and second voltages.

8. The sensor system of claim 7 wherein said voltage monitor means includes a delay element.

9. The sensor system of claim 8 wherein said delay element is an R-C circuit.

10. The sensor system of claim 1 including a pair of transistors for blocking the release signals upon receipt of a signal from said voltage monitor means.

11. The sensor system of claim 1 wherein said switching threshold means include a comparator, said comparator having a predetermined voltage supplied thereto by said evaluation circuit means, said evaluation circuit means being in the form of a voltage divider.

12. The sensor system of claim 1 wherein said amplifier means has an amplifier portion with inverting and non-inverting inputs and includes parallel-connected first and second field effect transistors, the first transistor being connected with its source to the non-inverting input of said amplifier portion and the second transistor being connected with its source to the inverting input of said amplifier portion, the drain electrodes of both being connected to one terminal of the means for supplying an input voltage, the control electrode of the first transistor being coupled by way of a voltage divider to said transducer means, the control electrode of the second transistor being coupled to the output of the amplifier portion and to a diode, which diode is connected to the reference voltage.

13. The sensor system of claim 1 wherein the integrating means has an inverting and non-inverting input, the signal from said transducer means being provided by way of a voltage divider to the non-inverting input of the integrating means, the amplifier means output being supplied to both the inverting input of the integrating means and, by way of a diode, to said reference voltage means to change said stabilized reference voltage when a maximum voltage, which is adjustable by means of said voltage divider, is exceeded.

14. The sensor system of claim 13 wherein means are included for rapid resetting of the integrating means, said integrating means including an integrator portion and an amplifier portion, said resetting means having the output of the integrator portion connected to the non-inverting input of the amplifier portion, said reference voltage being supplied to the inverting side of the input of the amplifier portion, the output of the amplifier portion being fed back by way of a series resistor and diode to the inverting input of the integrating means.

15. A sensor system as in claim 1 wherein the sensor system is adapted for use with a vehicle having a predetermined number of passengers and a driver, the switching threshold means includes a comparator element corresponding to each of the passengers, the comparator elements having non-inverting inputs which are connected in parallel, said integrating means having an output which is supplied thereto, the comparator elements having inverting inputs being supplied by respective voltage dividers from the reference voltage means, the inverting input of the comparator element for passengers being set at a higher potential than corresponding to the driver of the vehicle.

16. A sensor system as in claim 1 wherein the sensor system is adapted for use with a vehicle subject to normal and abnormal driving accelerations, including means for supplying a proportional constant voltage to said integrating means, which voltage is set slightly above said normal driving accelerations.

* * * * *